United States Patent [19]

Taylor et al.

[11] Patent Number: 5,240,652
[45] Date of Patent: Aug. 31, 1993

[54] LIQUID DISTRIBUTOR FOR A VAPOR-LIQUID CONTACTING COLUMN

[75] Inventors: Mark F. Taylor, Lakeview; Richard A. Victor, Grand Island; James D. Augustyniak, Depew; Michael J. Lockett, Grand Island, all of N.Y.

[73] Assignee: Praxair Technology, Inc., Danbury, Conn.

[21] Appl. No.: 958,201

[22] Filed: Oct. 8, 1992

[51] Int. Cl.$^5$ .............................................. B01F 3/04
[52] U.S. Cl. ...................................................... 261/97
[58] Field of Search .......................................... 261/97

[56] References Cited

U.S. PATENT DOCUMENTS

| | | | |
|---|---|---|---|
| 3,232,590 | 2/1966 | Eckert | 261/97 |
| 3,259,380 | 7/1966 | Brown | 261/97 |
| 3,281,133 | 10/1966 | Eckert | 261/97 |
| 3,360,246 | 12/1967 | Eckert | 261/97 |
| 3,446,489 | 5/1969 | Leva | 261/97 |
| 3,524,731 | 8/1970 | Effron et al. | 261/97 |
| 3,570,825 | 3/1971 | Eckert | 261/96 |
| 4,427,605 | 1/1984 | Meier et al. | 261/97 |
| 4,472,325 | 9/1984 | Robbins | 261/96 |
| 4,689,183 | 8/1987 | Helms et al. | 261/97 |
| 4,816,191 | 3/1989 | Berven et al. | 261/97 |
| 5,013,491 | 5/1991 | Nutter | 261/97 |
| 5,158,713 | 10/1992 | Ghelfi et al. | 261/97 |

OTHER PUBLICATIONS

"Mellatech Column Internals, The Concept for Packed Columns", Brochure 22.51.06.40–V.91–50, Sulzer Brothers Limited, Product Division Chemtech, Winterthur, Switzerland.

*Primary Examiner*—Tim Miles
*Attorney, Agent, or Firm*—Peter Kent

[57] ABSTRACT

An apparatus for distributing liquid over the cross section of a liquid-vapor contacting column comprising a distributor plate having orifices for downward liquid flow and risers for upward vapor flow. Above the distributor plate is a trough for receiving liquid to be distributed. The vapor risers directly below the trough extend through the trough. The trough floor has annular openings around the penetrating vapor risers to discharge liquid onto the distributor plate below.

8 Claims, 4 Drawing Sheets

5,240,652

LIQUID DISTRIBUTOR FOR A VAPOR-LIQUID CONTACTING COLUMN

TECHNICAL FIELD

This invention relates to apparatus for collecting liquid flowing over the cross section of a vapor-liquid contacting column and distributing liquid to flow over the cross section of a vapor-liquid contacting column.

BACKGROUND OF THE INVENTION

In a liquid-vapor contacting column, intimate contacting of vapor and liquid flowing vertically in the column is sought by subdividing each phase to create a large exposed surface and contacting the subdivisions. A common technique is to pass the phases through a bed of packing seeking to cause the liquid to flow as films over the surfaces of the packing. Even with uniform distribution of the liquid across the column cross section at the top of the column, as the liquid descends, it agglomerates within the packing into rivulets that channel through the packing. The descending liquid also often flows preferentially along the column wall and agglomerates to flow as a film along the column wall. The agglomeration of the liquid reduces the desired interchange between the liquid and vapor, causing concentration gradients to occur in the liquid and vapor across the column cross section. To counter these effects, a vertical space is provided in the column for a device to mix the liquid and to mix the vapor and then distribute these mixed streams uniformly across the column cross section for further flow within the column in contact with each other.

There are known devices that cover the column cross section and allow vapor flows to pass through while collecting liquid from across the column cross section. These collectors then typically discharge the collected liquid downward through a downcomer pipe to a trough or pan occupying part of the cross section of the column. From the trough, the liquid is discharged further downward in a number of streams to a distributor plate or pan occupying substantially the full cross section of the column. The plate or pan has a number of distributed orifices for liquid flow and a number of distributed flues for vapor flow.

In such conventional devices, the distributor plate or pan is of thin gauge sheet metal. The orifices for liquid flow are formed by punching or drilling which leads to variation in size and shape of the orifices. The openings for installation of the flues are punched and the flues are welded into the openings. This punching and welding also distorts the plate or pan metal causing variations in the liquid orifices. During operation of the column, these variations in the liquid orifices cause variation in the magnitude of the liquid flows from the orifices and thus nonuniformity in the distribution of liquid across the column cross section.

In the known devices, the liquid flow or flows delivered to the distributor plate from above have considerable velocity and magnitude. Thus these flows spread laterally across the distributor plate with significant velocities. When a lateral flow occurs near a liquid orifice it alters the liquid head producing flow through the orifice. Consequently a variation in the magnitudes of flow delivered by the orifices occurs from this factor as well.

The known devices also require considerable column height which reduces the available height for packing and is costly to provide. The current invention alleviates the aforementioned shortcomings of the prior art.

SUMMARY OF THE INVENTION

The invention provides an apparatus for collecting liquid flowing downward in a vapor-liquid contacting column and distributing it across the column. The apparatus comprises a distributor plate having a plurality of orifices for liquid flow and a plurality of openings for vapor flow. A vapor riser extends upward from each vapor opening. Above the distributor plate is a trough having a wall, a plurality of orifices for liquid discharge, and a floor. The vapor risers located directly below the trough floor penetrate the floor and extend through the trough. In the floor, around the risers penetrating the floor are annular openings for discharging liquid from the trough onto the distributor plate below. The distributor plate is preferably from about 1 to about 2 cm thick. The vapor risers are segments of tube rolled into the vapor openings in the distributor plate.

The trough includes one or a pair of weirs which form an open-top compartment in the trough. Above the trough is a collector plate for catching and collecting liquid descending across the column cross section. The collector plate has a plurality of vapor risers to pass vapor through the plate and a downcomer extending downward into the trough compartment. The liquid collected on the collector plate flows laterally on the plate to the downcomer and then down to the trough compartment, inherently mixing as it flows.

Optionally the distributor plate has an upwardly extending baffle surrounding all locations on the distributor plate where fluid streams from the trough impinge.

In another embodiment of the invention, the vapor risers extending from the distributor plate extend short of the floor of the trough. The trough has orifices for discharging liquid downward. Between the trough and the distributor is a deflector plate of at least sufficient extent to intersect all of the liquid streams emanating from the trough. The vapor risers directly below the deflector plate penetrate and extend through the deflector plate. Annular openings in the deflector plate around the penetrating vapor risers serve to discharge liquid onto the distributor plate.

DETAILED DESCRIPTION OF THE INVENTION

Figure 1:
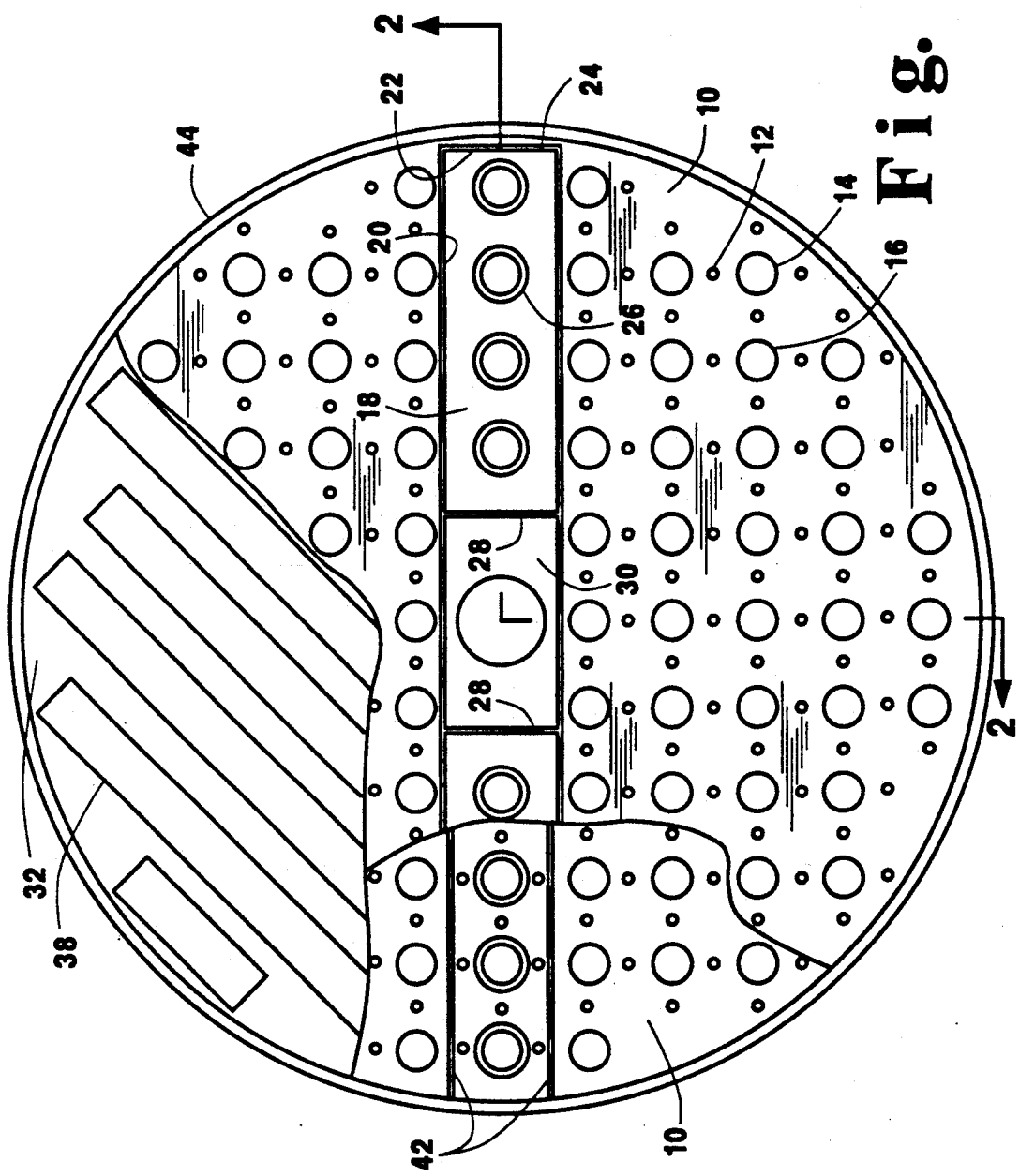
FIG. 1 is a plan view of the invention showing sections at three different levels.
Figure 2:
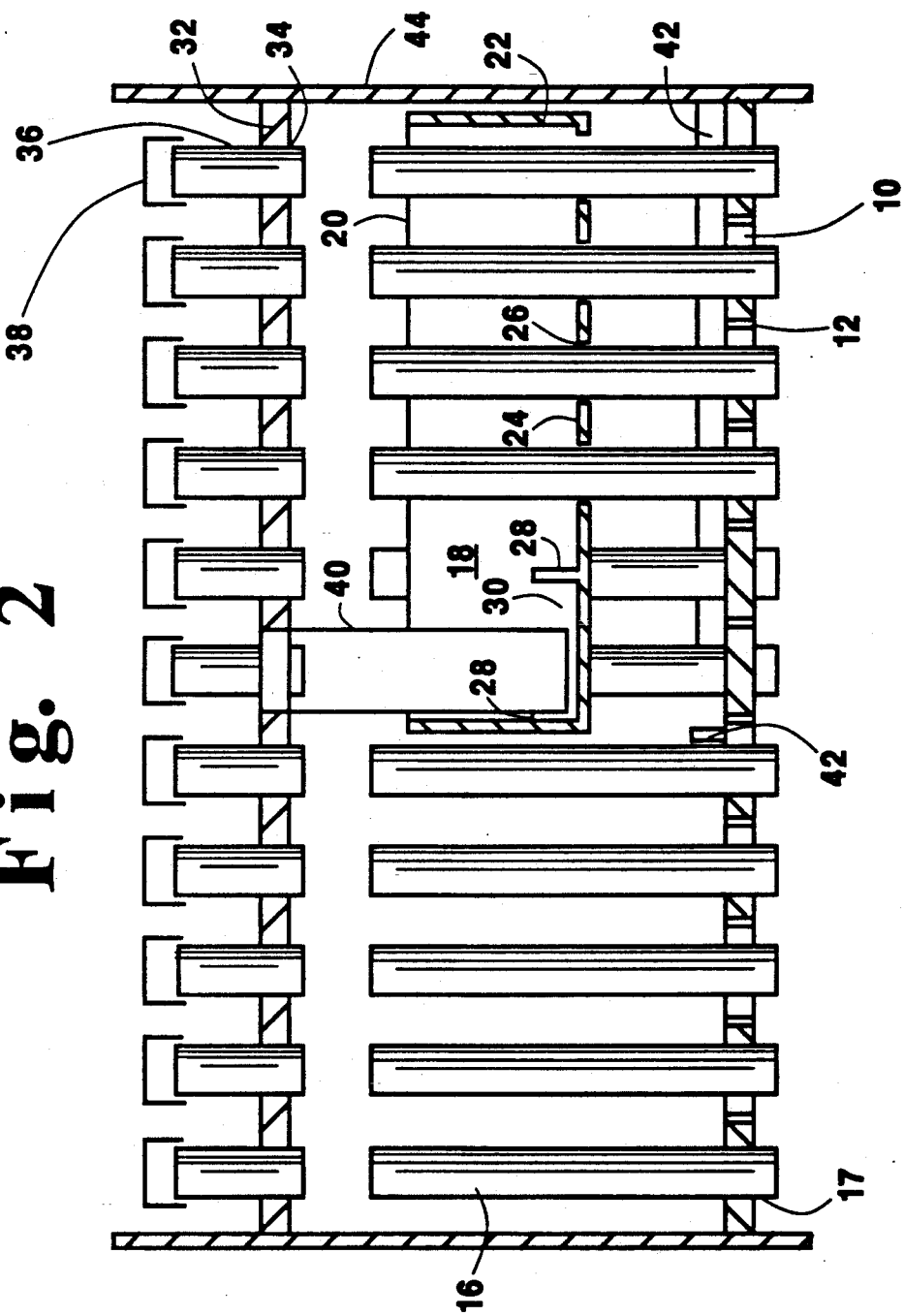
FIG. 2 is vertical sectional view in the direction of the arrows 2—2 in FIG. 1.

Referring to FIGS. 1 and 2, a first embodiment of the invention is described as when in operation in a liquid-vapor contacting column. The invention comprises a distributor plate 10 having a plurality of orifices 12 for liquid flow typically arranged in a regular pattern of from about 5 to 10 cm pitch. The orifice diameter used depends on the application, but may typically range from about 0.2 cm to about 0.5 cm. Preferably the distributor plate is from about 1 to about 2 cm thick. Preferably the liquid orifices are drilled and reamed into the plate thereby producing orifices of identical size.

The preferred orifice size combined with the preferred plate thickness yields a ratio of plate thickness to hole diameter of approximately 2. With operation at a Reynolds number of at least 13,000, this configuration produces an orifice discharge coefficient that is insensitive to flow rate. Thus this orifice configuration with orifices of identical size is capable of providing a plurality of flow streams of identical size over a range of flow rate.

Spaced between the orifices in the distributor plate is a plurality of vapor openings 14 into each of which is fixed a vapor riser 16 comprising a segment of tube. The preferred range of distributor plate thickness allows the risers to be installed by being rolled into the plate using a tubing expander. Thus the warpage resulting from welding and other installation methods involving heating is avoided.

Above the distributor plate is a distribution trough 18, typically having two side walls 20, two end plates 22 and a floor 24 to form a rectangular cross section. Typically the trough length spans the distributor plate. The vapor risers 16 directly below the trough extend through the floor 24 of the trough to a level typically even with or somewhat above the top of the trough walls. In the trough floor or walls are orifices 26 for liquid flow which may be round openings. Preferably the trough orifices are annular openings around the vapor risers that penetrate the floor of the trough.

Spanning the width of the trough is at least one weir 28 forming an open-top compartment 30 within the trough. Preferably two weirs are provided approximately in the middle of the trough length to form a compartment at the approximate center of the trough length.

Above the trough is a collector plate 32 with a regular array of openings 34, each opening retaining a segment of tubing to form an upwardly extending vapor riser 36. A cover 38 is provided for each vapor riser to deflect droplets of liquid falling from above. The cover may comprise an inverted trough covering several risers or a hat covering a single riser. From the approximate center of the collector plate, a downcomer 40 for liquid extends downward into the trough compartment below, preferably to a level below the top of the weir in the trough.

An optional feature is a low, upstanding baffle 42 on the distributor plate, the baffle surrounding all locations on the distributor plate where fluid streams from the distributor trough impinge during operation of the invention.

The distributor plate and the collector plate may be supported from and sealed to the wall of a vapor-liquid contacting column. Alternatively these members may be enclosed in and sealed to a cylindrical housing 44 which can be installed within a vapor-liquid contacting column and sealed to the column wall.

When the invention is in operation in a vapor-liquid contacting column, liquid drips from above on to the collector plate 32, and flows laterally on the collector plate to the downcomer 40 in the collector plate. The liquid is inherently mixed as it flows down the downcomer into the compartment 30 below formed by the weirs 28 in the trough. The liquid overflows the weirs in the trough and flows lengthwise in the remainder of the trough. Liquid passes through the annular openings 26 in the floor and flows in a film down the outer surface of the floor-penetrating risers to the distributor plate 10 below.

The liquid flow leaving the trough 18 takes the form of a plurality of descending streams of relatively wide cross sectional area and thus these streams flow at relatively low velocity. Consequently on reaching the distributor plate, the liquid spreads out laterally with low lateral velocities causing little variation in the liquid head on the distributor plate, and therefore little variation in the magnitude of the streams emanating from the distributor plate orifices.

The optional baffle 42 on the distributor plate typically is submerged in the liquid on the distributor plate. The baffle causes the liquid flow descending from the trough 18 to flow laterally in a layer near the surface of the liquid on the distributor plate 10, further lessening the effect of lateral liquid flow upon the orifices adjacent to the baffle, and further reducing orifice flow variation.

Vapor flows vertically through the vapor risers in the distributor plate and the collector plate. Preferably the vapor risers 16 in the distributor plate are staggered with respect to the vapor risers 36 in the collector plate, thereby promoting mixing of the vapor between these elements. Advantageously, the trough does not interfere with vapor flow between the distributor and the collector because the vapor risers from the distributor plate pass through the trough. Thus relative to other configurations, relatively little vertical clearance needs to be provided between the distributor plate, the trough and the collector plate, advantageously allowing these members to occupy only a relatively short vertical span in a vapor-liquid column.

Figure 3:
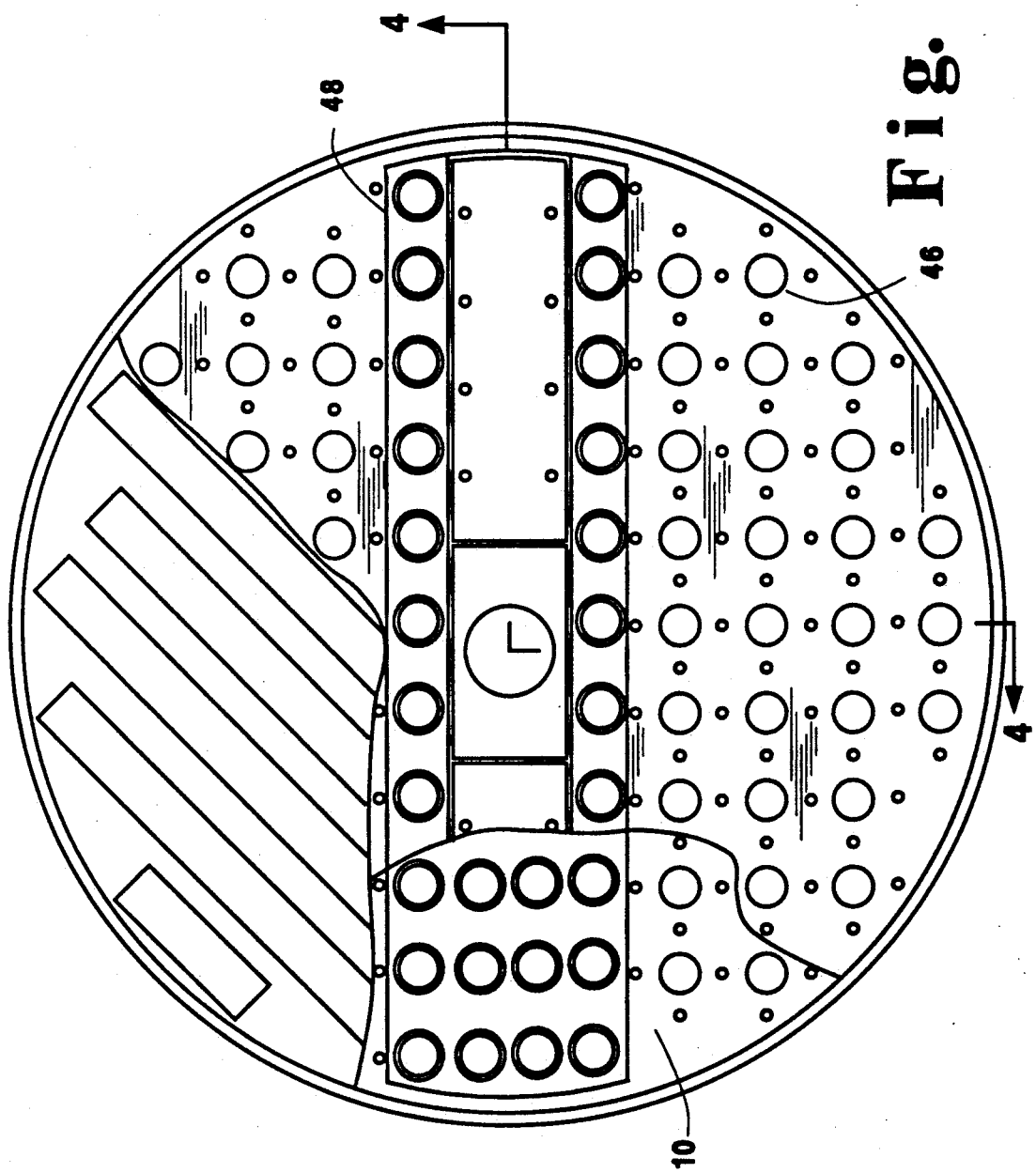
FIG. 3 is a plan view of another embodiment of the invention showing sections at three deferent levels.
Figure 4:
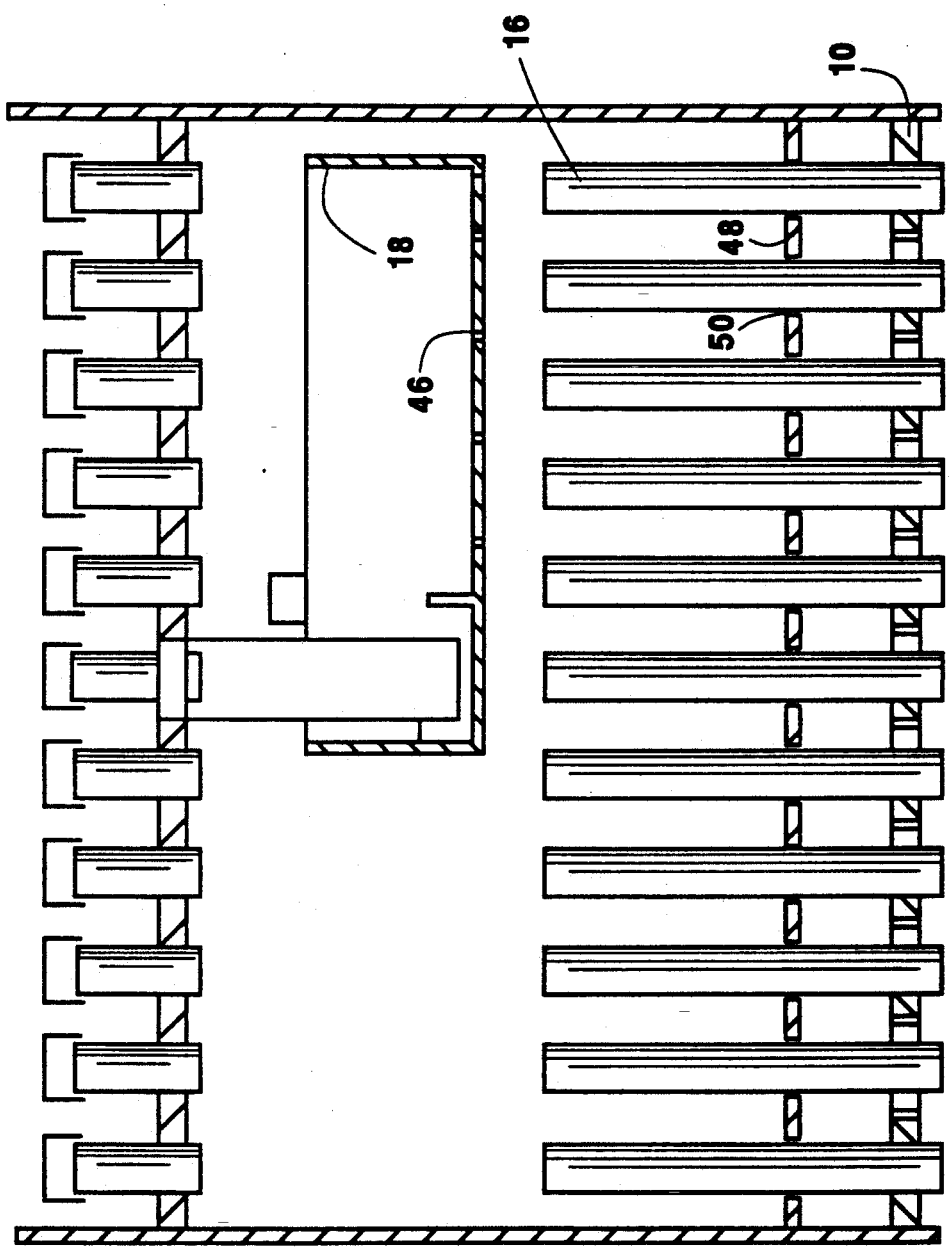
FIG. 4 is a vertical sectional view in the direction of the arrows 4—4 in FIG. 3.

FIGS. 3 and 4 depict a second embodiment of the invention. Only the differences from the first embodiment are described. In the second embodiment, the vapor risers 16 originating from the distributor plate 10 do not extend through the trough 18 but terminate below the trough. The trough has circular openings 46 in the floor to discharge liquid downward.

An additional member, a deflector plate 48, is located below the trough and above the distributor plate. The lateral extent of the deflector plate may approximate only that of the trough floor. Optionally the lateral extent of the deflector plate may extend over most of the distributor plate. The vapor risers in the distributor plate that originate directly below the deflector plate pass through the deflector plate. In the deflector plate are a plurality of liquid orifices 50. These orifices preferably are annular openings surrounding the vapor risers that pass through the deflector plate. Alternatively these orifices may be circular openings in the deflector plate. The deflector plate may be supported from the distributor plate or from the cylinder supporting the distributor plate.

In operation the deflector plate deflects the streams of liquid emanating from orifices in the trough so that these streams do not impinge directly on the orifices in the distributor plate.

Although the invention has been described with respect to specific embodiments, it will be appreciated that it is intended to cover all modifications and equivalents within the scope of the appended claims.

What is claimed is:

1. An apparatus for distributing a liquid flow across a vapor-liquid contacting column, said apparatus comprising:
   (a) a distributor plate having:

(1) plurality of liquid orifices;
(2) a plurality of vapor openings; and
(3) a vapor riser extending upward from each vapor opening; and
(b) a distribution trough above said distributor plate, said trough having:
(1) a wall;
(2) a floor through which the vapor risers directly below said floor extend; and
(3) a plurality of orifices.

2. The apparatus as in claim 1 wherein said trough orifices are annular openings around said vapor risers which extend through said trough floor.

3. The apparatus as in claim 1 wherein said distributor plate is from about 1 to about 2 cm thick and said vapor risers are segments of tubing rolled into said vapor openings in said distributor plate without welding of said tubing to said distributor plate.

4. The apparatus as in claim 1 further comprising:
(c) a weir forming an open-top compartment in said trough; and
(d) a collector plate located above said distributor plate, said collector plate comprising:
(1) a plurality of upwardly extending vapor risers;
(2) a cover for the top of each of said vapor risers; and
(3) a downcomer extending downward from said collector plate into said trough compartment.

5. The apparatus as in claim 1 further comprising an upwardly extending baffle on said distributor plate, said baffle surrounding all locations on said distributor plate where fluid streams from said trough orifices are intended to impinge.

6. An apparatus for distributing a liquid flow across a vapor-liquid contacting column, said apparatus comprising:
(a) a distributor plate having:
(2) a plurality of liquid orifices;
(2) a plurality of vapor openings; and
(3) a vapor riser extending upward from each of said vapor openings; and
(b) a deflector plate above said distributor plate, said deflector plate having:
(2) a plurality of openings through which said vapor risers extend; and
(2) a plurality of orifices; and
(c) a distribution trough above said deflector plate, said trough having:
(1) a wall;
(2) a floor, and
(3) a plurality of orifices.

7. The apparatus as in claim 6 wherein the deflector orifices are annular openings around said vapor risers which extend through said trough floor.

8. The apparatus as in claim 6 further comprising:
(c) a weir forming an open-top compartment in said trough; and
(d) a collector plate located above said distributor plate, said collector plate comprising:
(1) a plurality of upwardly extending vapor risers;
(2) a cover for the top of each of said vapor risers; and
(3) a downcomer extending downward from said collector plate into said trough compartment.

* * * * *